(12) United States Patent  (10) Patent No.: US 7,744,110 B1
Ramon  (45) Date of Patent: Jun. 29, 2010

(54) VEHICLE-TO-TRAILER HITCH GUIDE AND SYSTEM OF USE THEREFOR

(76) Inventor: Miguel M. Ramon, 5202 Alegre La., Robstown, TX (US) 78380

( * ) Notice: Subject to any disclaimer, the term of this patent is extended or adjusted under 35 U.S.C. 154(b) by 0 days.

(21) Appl. No.: 12/322,224

(22) Filed: Jan. 30, 2009

(51) Int. Cl.
B60D 1/36 (2006.01)

(52) U.S. Cl. ..................................................... 280/477

(58) Field of Classification Search ................. 280/477, 280/416.1
See application file for complete search history.

(56) References Cited

U.S. PATENT DOCUMENTS

| | | | |
|---|---|---|---|
| 3,879,062 A | | 4/1975 | Miller |
| 4,226,438 A | * | 10/1980 | Collins ........................ 280/477 |
| 4,254,968 A | | 3/1981 | DelVecchio |
| 4,416,466 A | | 11/1983 | Park |
| 4,417,748 A | * | 11/1983 | Dortch ........................ 280/477 |
| 4,432,563 A | | 2/1984 | Pitcher |
| 4,560,183 A | | 12/1985 | Cook |
| 4,657,275 A | | 4/1987 | Carroll |
| 4,781,394 A | * | 11/1988 | Schwarz et al. .............. 280/477 |
| 4,840,392 A | * | 6/1989 | Baskett ........................ 280/477 |
| 4,844,496 A | | 7/1989 | Webb et al. |
| 4,871,184 A | | 10/1989 | Johnson |
| 4,871,185 A | * | 10/1989 | Chakroff et al. ............. 280/477 |
| 5,180,182 A | | 1/1993 | Haworth |
| 5,465,992 A | * | 11/1995 | Anderson .................... 280/477 |
| 5,503,422 A | | 4/1996 | Austin |
| 5,516,139 A | * | 5/1996 | Woods ........................ 280/477 |
| 5,529,330 A | * | 6/1996 | Roman ........................ 280/477 |
| 5,549,316 A | * | 8/1996 | Jones .......................... 280/477 |
| 5,758,893 A | | 6/1998 | Schultz |
| 5,779,256 A | * | 7/1998 | Vass ............................ 280/477 |
| 5,909,892 A | * | 6/1999 | Richardson .................. 280/477 |
| 6,948,733 B2 | * | 9/2005 | Webster et al. .............. 280/477 |
| 6,976,694 B1 | * | 12/2005 | Rayl et al. ................... 280/477 |

* cited by examiner

Primary Examiner—Tony H. Winner
(74) Attorney, Agent, or Firm—Robert C. Montgomery

(57) ABSTRACT

An apparatus that guides a trailer tongue onto a trailer hitching ball with minimal assistance is herein disclosed. The apparatus forms a general "V"-shape with the open part of the "V" facing outward from the rear of the tow vehicle, and the closed part of the "V" being adjacent to the hitch ball itself. The apparatus allows the driver to reverse the tow vehicle up the trailer and the self-guiding nature of the device will guide the trailer hitch toward the hitch ball where it stops once centered over the ball. At this point the user can exit the tow vehicle and lower the trailer onto the hitch in a conventional manner. Also, the "V"-shaped portion of the apparatus is detachable and can be detached by pulling the restraining pin and removing. In such a manner, the user is unencumbered by the "V"-shaped guide during regular driving activities.

17 Claims, 5 Drawing Sheets

VEHICLE-TO-TRAILER HITCH GUIDE AND SYSTEM OF USE THEREFOR

RELATED APPLICATIONS

The present invention was first described in a notarized Official Record of Invention on Apr. 25, 2008, that is on file at the offices of Montgomery Patent and Design, LLC, the entire disclosures of which are incorporated herein by reference.

FIELD OF THE INVENTION

The present invention relates generally to an apparatus that guides a trailer tongue of a trailer onto a trailer hitching ball of a tow vehicle.

BACKGROUND OF THE INVENTION

Hitching a trailer to a conventional hitch-type receiver on a vehicle can be a trying and stressful experience. This process usually requires two (2) people as the driver cannot see the hitch. Usually several attempts are necessary as a vehicle operator is limited by delayed reaction time waiting for the second person to relay the proper direction and distance. Accordingly, there is a need for a means by which one (1) person can safely and quickly align a tow vehicle to a trailer when coupling them together, thereby eliminating the need for an additional person aiding the operator. The development of the invention described herein fulfills this need.

There have been attempts in the past to improve upon trailer hitch guides. U.S. Pat. No. 5,758,893 issued to Schultz discloses a trailer hitch accessory comprising a substantially "V"-shaped ramp inclined about the hitch ball that guides the socket coupling of the trailer to a trigger position above the hitch ball. Unfortunately, this patent does not appear to disclose a vehicle to trailer hitch guide that comprises a removable guide assembly once a trailer is hitched to a vehicle, nor does the mechanism disclosed appear to be as uncomplicated as the disclosed apparatus.

U.S. Pat. No. 5,503,422 issued to Austin discloses a hitch alignment apparatus and method comprising a mount with a base for engaging the underside of a drawbar of a ball hitch and a latch pins for engaging the ball hitch above the base. Unfortunately, this patent does not appear to disclose a removable guide assembly.

U.S. Pat. No. 4,871,184 issued to Johnson discloses a guide assembly for a trailer hitch structure that appears to comprise a guide assembly that directs the distal free end of a coupling tongue into engagement with the hitch ball to facilitate coupling. Unfortunately, this patent does not appear to disclose a guide assembly that can be removed after a trailer is hitch, nor does the patent appear to disclose a guide assembly that is configured as the disclosed apparatus.

U.S. Pat. No. 5,180,182 issued to Haworth discloses a trailer hitch alignment device that discloses a system by which mirrors are used to facilitate viewing of the trailer hitch by a vehicle operator during the hitching process. Unfortunately, this patent does not appear to disclose a vehicle to trailer hitch guide that comprises a removable "V"-shaped guide assembly to guide the tongue of a trailer onto a hitch ball during hitching.

U.S. Pat. No. 4,844,496 issued to Webb et at discloses a trailer hitch guide that is slidably positionable. Unfortunately, this patent does not appear to disclose a vehicle to trailer hitch guide that comprises a removable guide assembly once a trailer is hitched to a vehicle via a locking cotter pin.

U.S. Pat. No. 4,657,275 issued to Carroll discloses a self-aligning trailer hitch that comprising a guide assembly that moves downward with the tongue of a trailer hitch to facilitate coupling of the hitch. Unfortunately, this patent does not appear to disclose a vehicle to trailer hitch guide that fits into any standard size receiver, nor does it appear to comprise a removable guide assembly.

U.S. Pat. No. 4,560,183 issued to Cook discloses a trailer hitch guide that mounts upon a base of a vehicle hitch and comprises a pair of detachably, mountable, lateral guides. Unfortunately, this patent does not appear to disclose a relatively uncomplicated means of hitching a trailer to a vehicle, nor does it appear to disclose a vehicle to trailer hitch guide that is adaptable to any standard receiver.

U.S. Pat. No. 4,416,466 issued to Park discloses a trailer hitch guide comprising a "V"-shaped flange on the bottom surface of the guide that guides a hitch ball into a position of alignment. Unfortunately, this patent does not appear to disclose a vehicle to trailer hitch guide that does not need to be removed to complete the coupling of a hitch ball to a trailer tongue, nor does it appear to comprise a similar configuration to the disclosed apparatus.

U.S. Pat. No. 4,254,968 issued to Del Vecchio discloses a removable ball guide attachment for trailer hitches. Unfortunately, this patent does not appear to disclose a "V"-shaped guide assembly that is mounted on the ball side of the hitch assembly.

U.S. Pat. No. 3,879,062 issued to Miller discloses a trailer hitch guide with a "V"-shaped guide assembly. Unfortunately, this patent does not appear to disclose a guide assembly that can be removed after a trailer is hitch, nor does the patent appear to disclose a guide assembly that is configured as the disclosed apparatus.

SUMMARY OF THE INVENTION

In light of the disadvantages as previously discussed in the prior art, it is apparent that there is a need for a vehicle-to-trailer hitch guide.

An object of the vehicle-to-trailer hitch guide comprises a hitch ball assembly which provides a tapered guide to direct a trailer tongue to a trailer hitching ball with minimal assistance.

A further object of the vehicle-to-trailer hitch guide allows a driver to direct back a tow vehicle up to a trailer and utilize the self-guiding shape of the apparatus to guide a trailer tongue toward the hitch ball where it stops upon contacting the apex portion of the apparatus while being coincidentally centered over said hitch ball.

Still another object of the vehicle-to-trailer hitch guide provides an easily removable means for the apparatus from the towing vehicle after hitching by pulling a provided locking pin.

Another aspect of the vehicle-to-trailer hitch guide comprises a hitch ball assembly comprising a square tubular ball mount device that may be inserted into a standard bumper-mounted receiver with particular welded-on enhancements which allow removable attachment of the "V"-shaped guide assembly. The hitch ball assembly further comprises a ball mount, a hitch ball, an end guide, a pin receiver, and a pair of locking apertures.

A further aspect of the vehicle-to-trailer hitch guide comprises a ball mount comprises a conventional welded assembly with a pair of locking apertures that comprise a standard pin-type locking means to a hitch receiver. The ball mount provides a welded attachment means to an end guide via a cylindrical pin receiver. The pin receiver provides a suitable female-type receiver to a locking pin portion of the guide assembly.

Still another aspect of the vehicle-to-trailer hitch guide comprises an end guide comprising a formed vertical metal shape forming a "V"-shape with an included angle and having the hitch ball located at a vertical centerline. The end guide provides a lateral guide and a mechanical stop to a tongue portion of a trailer during hitching.

Still a further aspect of the vehicle-to-trailer hitch guide comprises a floor plate, a pair of side plates, a pair of latch plates, a locking pin, a cotter pin, a ball notch, a trailer notch, and a pair of latch plate apertures.

Yet another aspect of the vehicle-to-trailer hitch guide comprises a floor plate portion comprising a generally triangular steel plate and further comprising a ball notch. The floor panel provides a welded attachment means to a pair of side plates. The side plates are butted to and coplanar with corresponding rearward edges of the end guide forming continuous and converging vertical surfaces.

Yet a further aspect of the vehicle-to-trailer hitch guide comprises a pinned attachment means to a pin receiver portion of the hitch assembly via a pair of forwardly extending latch plates attached to the floor plate. The latch plates comprise respective drilled latch plate apertures which are separated and aligned so as to mate thereto the open end portions of the pin receiver.

Yet still another aspect of the vehicle-to-trailer hitch guide comprises a floor plate comprising a trailer notch to provide clearance to a trailer, thereby facilitating the easy removal of the guide assembly from the apparatus following normal hitching of the trailer.

A method of installing and utilizing the vehicle to trailer hitch guide may be achieved by performing the following steps: installing the hitch assembly to an existing ball hitch receiver in a normal manner using the locking apertures for attachment to a vehicle; installing an appropriate sized hitch ball to the ball mount based upon an anticipated trailer tongue size to be hitched; securing said hitch ball using the integral ball shaft and corresponding nut in a normal manner; positioning the guide assembly against the hitch assembly such that the side plates are aligned and butted against edge portions of the end plate and the pin receiver is aligned with the latch plate aperture portions; securing the guide assembly to the hitch assembly by inserting the locking pin through said latch plates and pin receiver; securing the locking pin using the cotter pin; backing up the tow vehicle; guiding the tongue portion of the trailer along the side plates; proceeding until the tongue makes contact with the end guide; stopping and exiting the tow vehicle; lowering the tongue portion of the trailer in a normal manner until said tongue is engaged upon the hitch ball; securing the tongue to the hitch ball in a normal manner; removing the guide assembly from the apparatus by removing the cotter pin; extracting the locking pin; sliding the guide assembly in a rearward and downward direction until clear of the apparatus and trailer; storing the guide assembly until needed again; towing the trailer to a desired destination in an expected manner; detaching the trailer from the apparatus in a normal manner, as needed; and, benefiting from time saved and protection thereto the tow vehicle and trailer during the hitching act while using the present apparatus.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
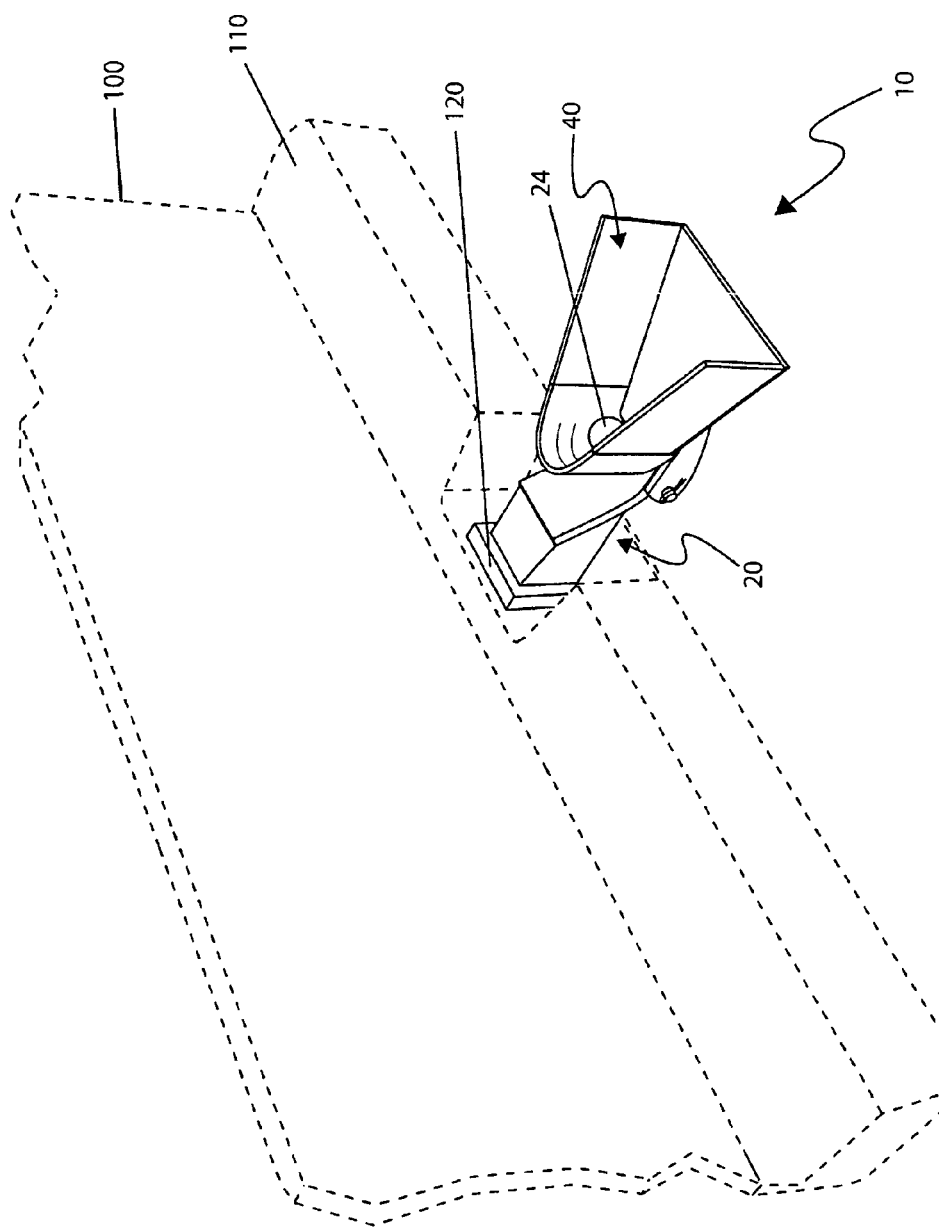
FIG. 1 is a perspective view of a vehicle-to-trailer hitch guide 10 depicting an as-use state, according to a preferred embodiment of the present invention.
Figure 2:
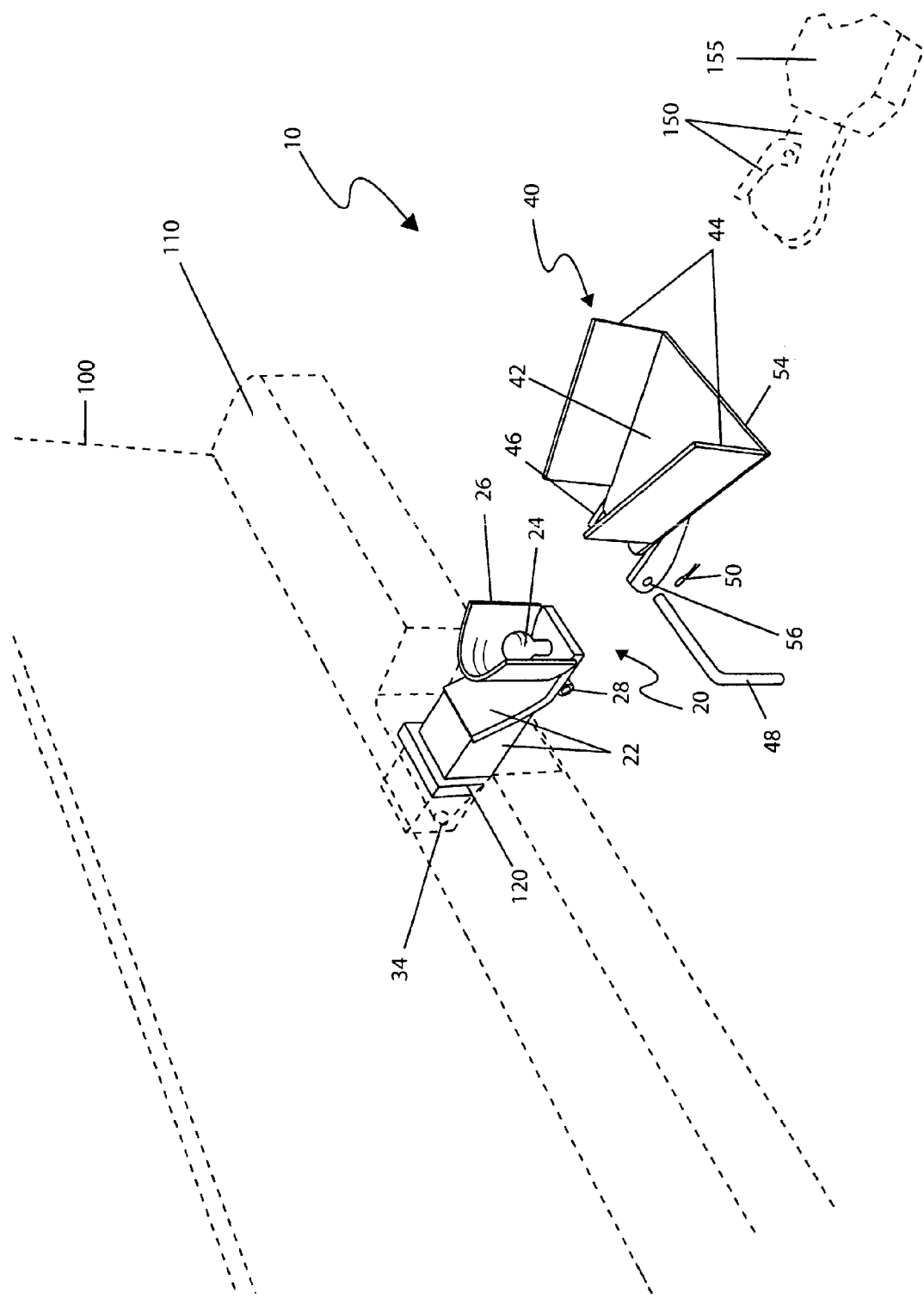
FIG. 2 is an exploded view of a vehicle-to-trailer hitch guide 10, according to a preferred embodiment of the present invention.
Figure 3:
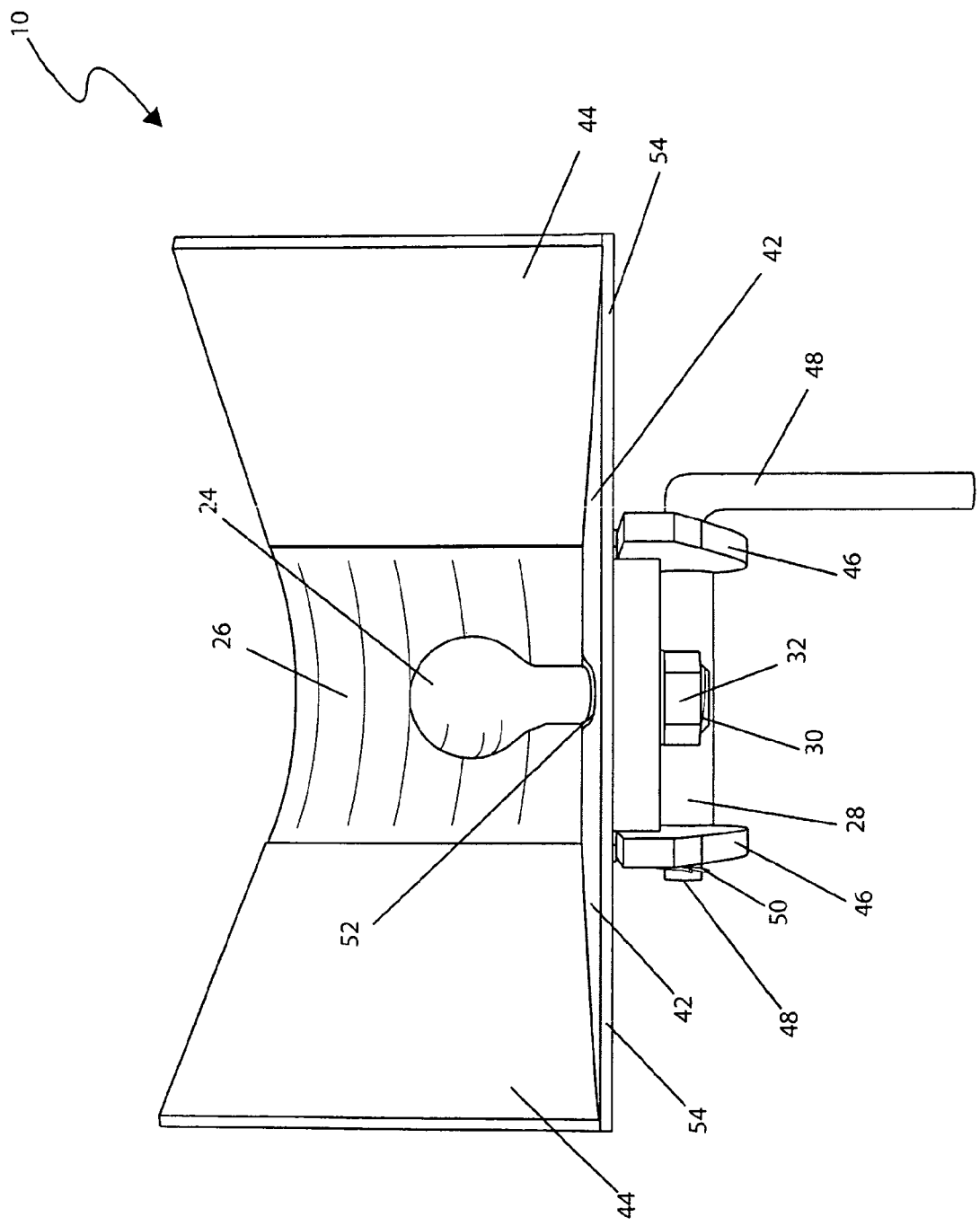
FIG. 3 is a forward looking view of a vehicle-to-trailer hitch guide 10, according to a preferred embodiment of the present invention.
Figure 4:
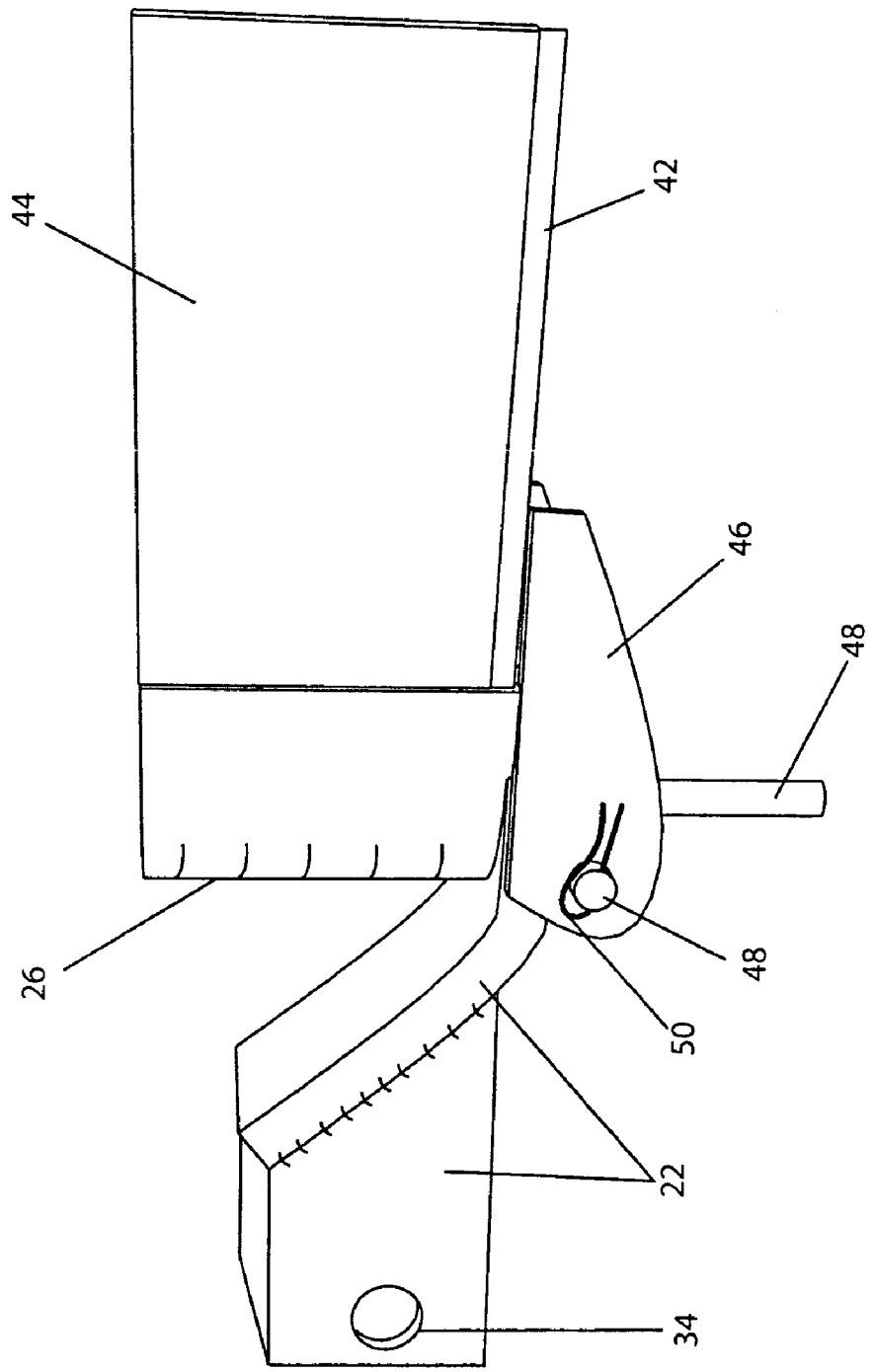
FIG. 4 is a side view of a vehicle-to-trailer hitch guide 10, according to a preferred embodiment of the present invention; and, FIG. 5 is a rearward looking view of a vehicle-to-trailer hitch guide 10, according to a preferred embodiment of the present invention.
Figure 5:
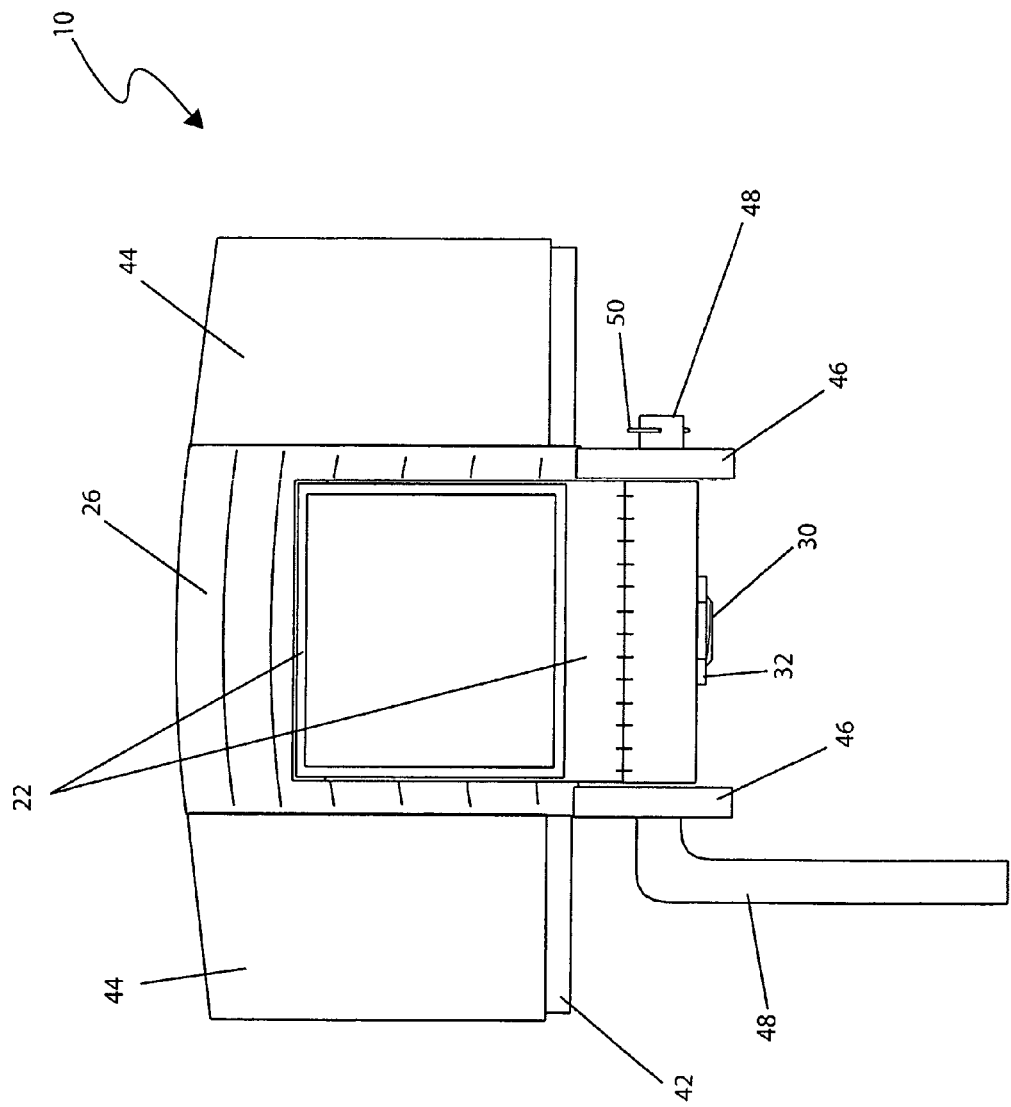

DESCRIPTIVE KEY 10 vehicle-to-trailer hitch guide
20 hitch ball assembly
22 ball mount
24 hitch ball
26 end guide
28 pin receiver
30 ball shaft
32 nut
34 locking aperture
40 guide assembly
42 floor plate
44 side plate
46 latch plate
48 locking pin
50 cotter pin
52 ball notch
54 trailer notch
56 latch plate aperture
100 vehicle
110 bumper
120 hitch receiver
150 tongue
155 trailer

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a vehicle-to-trailer hitch guide (herein described as the "apparatus") 10, which comprises a hitch ball assembly 20 providing a tapered guide to direct a trailer tongue 150 thereto a trailer hitching ball 24 with minimal assistance. The apparatus 10 forms a general "V"-shape with the open part of the "V" facing outwardly therefrom the rear of the towing vehicle 100 and the apex portion being curved and wrapping therearound a hitch ball 24. The apparatus 10 allows a driver to simply back a tow vehicle 100 up to a trailer 155 and utilize the self-guiding shape of the apparatus 10 to guide a trailer tongue 150 toward the hitch ball 24 where it stops upon contacting the apex portion of the apparatus 10 while being coincidentally centered over said hitch ball 24. At this point the user can exit the tow vehicle 100 and lower the trailer 155 onto the hitch ball 24 in a conventional manner. Also, the "V"-shaped apparatus 10 can be: removed after hitching by simply pulling a locking pin 48. In such a manner, a user is unencumbered by the apparatus 10 during regular driving activities.

Referring now to FIG. 1, a perspective view of the apparatus 10 depicting an as-use state view of the apparatus 10, according to the preferred embodiment of the present invention, is disclosed. The apparatus 10 comprises a hitch ball assembly 20, a hitch ball 24, and a guide assembly 40. The hitch ball assembly 20 provides a square tubular ball mount device designed for insertion thereinto a standard bumper-mounted 110 receiver being similar to many popular towing models; however, the hitch assembly 20 provides particular welded-on enhancements which allow removable attachment thereof the "V"-shaped guide assembly 40. The hitch ball assembly 20 is depicted here having a standard drop bar design; however, it is understood that other standard designs may be incorporated such as a straight bar or raised bar types while providing equal benefit and as such should not be considered a limiting factor of the apparatus 10.

Referring now to FIGS. 2 through 5, an exploded view and various perspective views of the apparatus 10, according to the preferred embodiment of the present invention, are disclosed. The apparatus 10 comprises a hitch ball assembly 20 and a guide assembly 40. The hitch ball assembly 20 and the guide assembly 40 comprise rugged weldments made using steel plate ranging from approximately one-quarter (¼) to one (1) inch thick and being plated or painted to protect from corrosion.

The hitch ball assembly 20 further comprises a ball mount 22, a hitch ball 24, an end guide 26, a pin receiver 28, and a pair of locking apertures 34. The ball mount 22 comprises a conventional welded assembly providing an insertable mounting means thereto the apparatus 10 thereto a common vehicle bumper 110 equipped therewith a common square hitch receiver 120. The ball mount 22 comprises a pair of locking apertures 34 providing a standard pin-type locking means thereto said hitch receiver 120. The hitch receiver 120 is envisioned to be an existing class 1, 2, or 3 type device; however, various design features of the ball mount 22 may be provided which are suitable thereto particular vehicle installations to accommodate vehicle 100 connection methods such as, but not limited to: direct bolting thereto a sub-structure, welding to a frame member, or the like. The ball mount 22 extends horizontally rearward therefrom the vehicle 100 comprising a standard hitch ball 24 having expected features and accessories including an integral downwardly extending threaded ball shaft 30 and fastening nut 32. The hitch ball 24 is envisioned to be provided in various load-rated sizes such as, but not limited to: one and seven-eighths (1⅞) and two (2) inch diameters. The ball mount 22 provides a welded attachment means thereto the end guide 26. The end guide 26 comprises a formed vertical metal shape approximately six (6) inches high forming a "V"-shape with an included angle comprising a radius of approximately three (3) inches and having the hitch ball 24 located at a vertical centerline thereof.

The end guide 26 provides a lateral guide and mechanical stop thereto the tongue portion 150 of a trailer 155 during hitching. The ball mount 22 interfaces therewith and provides an attachment means thereto the guide assembly 40 via a cylindrical pin receiver 28 being approximately four (4) inches wide and welded thereto said ball mount 22 along a bottom surface and extending in a lateral direction having a central orifice of approximately three-quarters (¾) of an inch in diameter. The pin receiver 28 provides a suitable female-type receiver thereto a locking pin portion 48 of the guide assembly 40. Once joined, the hitch ball assembly 20 and guide assembly 40 form a continuous "V"-shaped assembly as seen in FIG. 1.

The guide assembly 40 further comprises a floor plate 42, a pair of side plates 44, a pair of latch plates 46, a locking pin 48, a cotter pin 50, a ball notch 52, a trailer notch 54, and a pair of latch plate apertures 56. The floor plate portion 42 of the guide assembly 40 comprises a generally triangular steel plate which rests thereupon a top surface of the ball mount 22 and further comprises a ball notch 52 providing a forward contoured perimeter edge therearound the hitch ball 24 (see FIG. 3). The floor panel 42 provides a welded attachment means thereto a pair of side plates 44 welded thereto outer edges of said floor panel 42 being approximately twelve (12) inched wide and extending in an upward direction approximately six (6) inches. The side plates are butted thereto and coplanar therewith corresponding rearward edges of the aforementioned end guide 26 forming continuous and converging vertical surfaces. The guide assembly 40 provides a pinned attachment means thereto the pin receiver portion 28 of the hitch assembly 20 via a pair of forwardly extending latch plates 46 being welded thereto a bottom surface of the floor plate 42. The latch plates 46 comprise respective drilled latch plate apertures 56 at a forward location thereupon which are separated and aligned so as to mate thereto the open end portions of the aforementioned pin receiver 28. Upon insertion of the locking pin 48 therethrough the latch plate apertures 56 and the pin receiver 28, said locking pin 48 is secured in place using a common cotter pin 50 or equivalent securing means, thereby securing the guide assembly 40 in a horizontal position thereagainst the hitch assembly 20. The floor plate 42 further comprises a trailer notch 54 along a trailing edge to provide clearance thereto the trailer 155, thereby facilitating easy removal of the guide assembly 40 therefrom the apparatus 10 following normal hitching of the trailer 155.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: installing the hitch assembly 20 thereto an existing ball hitch receiver 120 in a normal manner using the locking apertures 34 for attachment thereto the vehicle 100; installing an appropriate sized hitch ball 24 thereto the ball mount 22 based upon an anticipated trailer tongue size 105 to be hitched; securing said hitch ball 24 using the integral ball shaft 30 and corresponding nut 32 in a normal manner; positioning the guide assembly 40 thereagainst the hitch assembly 20 such that the side plates 44 are aligned and butted thereagainst edge portions of the end plate 26 and the pin receiver 28 is aligned therewith the latch plate aperture portions 56; securing the guide assembly 40 thereto the hitch assembly 20 by inserting the locking pin 48 therethrough said latch plates 46 and pin receiver 28; securing the locking pin 48 using the cotter pin 50; backing up the tow vehicle 100; guiding the tongue portion 150 of the trailer 155 therealong the side plates 44; proceeding until the tongue 150 makes contact therewith the end guide 26; stopping and exiting the tow vehicle 100; lowering the tongue portion 150 of the trailer 155 in a normal manner until said tongue 150 is engaged thereupon the hitch ball 24; securing the tongue 150 thereto the hitch ball 24 in a normal manner; removing the guide assembly 40 therefrom the apparatus 10 by removing the cotter pin 50; extracting the locking pin 48; sliding the guide assembly in a rearward and downward direction until clear of the apparatus 10 and trailer 155; storing the guide assembly 40 until needed again; towing the trailer 155 thereto a desired destination in an expected manner; detaching the trailer 155 therefrom the apparatus 10 in a normal manner, as needed; and, benefiting from time saved and protection thereto one's tow vehicle 100 and trailer 155 during a trailer hitching event while using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An automobile trailer hitch guide device, comprising:
   a hitch ball assembly attached thereto an automobile hitch receiver and comprising a hitch ball, further comprising:
      a ball mount attached thereto and extending rearwardly outward therefrom said automobile hitch receiver, and comprising said hitch ball; and,
      an end guide attached thereto and extending vertically upwards therefrom said ball mount and comprising a first rear edge and a second rear edge;
      wherein said end guide is in between said automobile hitch receiver and said hitch ball;
      wherein said hitch ball is located at a vertical centerline thereof said end guide;
      wherein said end guide is substantially "V"-shaped; and,
      wherein said end guide provides a lateral guide and a mechanical stop thereto a trailer tongue during said hitching act; and,
   a guide assembly removably attached thereto said hitch ball assembly, further comprising:
      a floor plate substantially triangular-shaped and comprising a first side edge and a second side edge opposite said first side edge;
      a first side plate extending perpendicularly upwards therefrom said first side edge of said floor plate; and,
      a second side plate extending perpendicularly upwards therefrom said second side edge of said floor plate;
      wherein said floor plate rests thereupon a top surface of said ball mount when said guide assembly is connected therewith said hitch ball assembly;
      wherein said first side plate is abutted thereto and coplanar therewith said first rear edge of said end guide when said guide assembly is connected therewith said hitch ball assembly; and,
      wherein said second side plate is abutted thereto and coplanar therewith said second rear edge when said guide assembly is connected therewith said hitch ball assembly;
   wherein said guide assembly and said hitch ball assembly when attached theretogether comprise a "V"-shape with an open part of said "V"-shape facing outward therefrom said automobile hitch receiver and an apex part of said "V"-shape wrapped therearound said hitch ball; and,
   wherein said open part of said guide assembly receives said trailer tongue of a trailer therein and provides a guiding means to direct said trailer tongue thereto said hitch ball during a hitching act.

2. The device of claim 1, wherein said end guide extends vertically upwards approximately six (6) inches therefrom said ball mount.

3. The device of claim 1, wherein said end guide has an included angle comprising a radius of approximately three (3) inches.

4. The device of claim 1, wherein said hitch ball is available in a variety of different sizes.

5. The device of claim 1, wherein said device further comprises:
   a pin receiver attached thereto a bottom surface of said ball mount; and,
   a pair of latch plates attached thereto a bottom surface of said floor plate, each comprising a latch plate aperture;
   wherein said guide assembly is removably attached thereto said hitch ball assembly by aligning said latch plate apertures with said pin receiver and securing with a locking pin therethrough.

6. The device of claim 1, wherein said first side plate is approximately twelve (12) inches wide.

7. The device of claim 1, wherein said second side plate is approximately twelve (12) inches wide.

8. The device of claim 1, wherein said first side plate extends approximately six (6) inches perpendicularly upward therefrom said floor plate.

9. The device of claim 1, wherein said second side plate extends approximately six (6) inches perpendicularly upward therefrom said floor plate.

10. The device of claim 1, wherein said hitch ball assembly comprises a drop bar design.

11. The device of claim 1, wherein said hitch ball assembly comprises steel.

12. The device of claim 1, wherein said guide assembly comprises steel.

13. The device of claim 1, wherein said ball mount is approximately one-quarter (¼) to one (1) inch thick.

14. The device of claim 1, wherein said floor plate is approximately one-quarter (¼) to one (1) inch thick.

15. The device of claim 1, wherein said hitch ball assembly comprises a corrosion resistance material.

16. The device of claim 1, wherein said guide assembly comprises a corrosion resistance material.

17. A method for using an automobile trailer hitch guide device to hitch a trailer thereto a tow vehicle, said method comprising the steps of:
   providing said device, comprising:
      a hitch ball assembly attached thereto an automobile hitch receiver and comprising a hitch ball, further comprising:

a ball mount attached thereto and extending rearwardly outward therefrom said automobile hitch receiver, and comprising said hitch ball; and, an end guide attached thereto and extending vertically upwards therefrom said ball mount and comprising a first rear edge and a second rear edge;

wherein said end guide is in between said automobile hitch receiver and said hitch ball;

wherein said hitch ball is located at a vertical centerline thereof said end guide;

wherein said end guide is substantially "V"-shaped; and, wherein said end guide provides a lateral guide and a mechanical stop thereto a trailer tongue during said hitching act; and, a guide assembly removably attached thereto said hitch ball assembly, further comprising:

a floor plate substantially triangular-shaped and comprising a first side edge and a second side edge opposite said first side edge;

a first side plate extending perpendicularly upwards therefrom said first side edge of said floor plate; and, a second side plate extending perpendicularly upwards therefrom said second side edge of said floor plate;

wherein said floor plate rests thereupon a top surface of said ball mount when said guide assembly is connected therewith said hitch ball assembly;

wherein said first side plate is abutted thereto and coplanar therewith said first rear edge of said end guide when said guide assembly is connected therewith said hitch ball assembly; and, wherein said second side plate is abutted thereto and coplanar therewith said second rear edge when said guide assembly is connected therewith said hitch ball assembly;

wherein said guide assembly and said hitch ball assembly when attached theretogether comprise a "V"-shape with an open part of said "V"-shape facing outward therefrom said automobile hitch receiver and an apex part of said "V"-shape wrapped therearound said hitch ball; and, wherein said open part of said guide assembly receives a trailer tongue of a trailer therein and provides a guiding means to direct said trailer tongue thereto said hitch ball during a hitching act;

installing said hitch ball assembly thereto said automobile hitch receiver;

installing an appropriate sized hitch ball thereto a ball mount based upon an anticipated trailer tongue size to be hitched;

positioning said guide assembly thereagainst said hitch assembly such that a first side plate and a second side plate each are aligned and butted thereagainst a first rear edge and a second rear edge of an end guide and a pin receiver is aligned therewith a pair of latch plates, wherein each latch plate comprises a latch plate aperture;

securing said guide assembly thereto said hitch assembly by inserting a locking pin therethrough said latch plate apertures and said pin receiver;

backing up said tow vehicle;

guiding said trailer tongue of said trailer therealong said first side plate and said second side plate;

proceeding until said trailer tongue makes contact therewith said end guide;

stopping and exiting said automobile;

lowering said trailer tongue until said trailer tongue is engaged thereupon said hitch ball;

securing said trailer tongue thereto said hitch ball;

removing said guide assembly therefrom said hitch ball assembly;

sliding said guide assembly in a rearward and downward direction until clear of said hitch ball assembly and said trailer;

storing said guide assembly until needed again;

towing said trailer thereto a desired destination;

detaching said trailer, as needed; and, benefiting from time saved and protection thereto said tow vehicle and trailer during said hitching act while using said device.

* * * * *